Patented Jan. 9, 1934

1,942,879

UNITED STATES PATENT OFFICE

1,942,879

REFRACTORY MATERIAL AND BATCH AND METHOD FOR MAKING THE SAME

Frank H. Riddle, Detroit, Mich., assignor, by mesne assignments, to Champion Spark Plug Company, Toledo, Ohio, a corporation of Delaware No Drawing. Application May 7, 1931
Serial No. 535,799

18 Claims. (Cl. 106—9)

This application relates to a refractory material and to a batch and method for making said material. More particularly the invention relates to what is generally known as super-refractory materials and their production, and to such materials containing mullite.

This application is a continuation of my copending application for Super-refractory ceramic material, Serial No. 183,004, filed April 11, 1927, insofar as the disclosed subject matter is common to the two applications.

The object of the invention is to produce a material of the kind described in an economical and efficient manner and one which will have superior qualities, particularly relatively high strength at high temperatures. Material of this kind is particularly desirable for fire proof construction connected with furnaces and kilns where there is appreciable strain on the construction at high temperatures. For example, furnace walls or linings where extremely high temperatures are used and saggers and other kiln furniture for firing products to high temperatures require the ability to retain considerable strength at the elevated temperatures to which they are subjected.

By sufficiently high firing mullite can be produced from a wide variety of materials containing the ingredients, alumina and silica. Mullite products are quite refractory, as mullite has a melting point of about 1810° C. However, it has been found that the strength of the finished mullite product varies with variations in ingredients from which the mullite is formed.

There are found in nature many minerals containing alumina and silica in combination, but these seem to all contain a greater amount of silica than does mullite. The molecule of mullite contains three molecules of alumina and two of silica. The molecular proportion of clay is one of alumina to two of silica. The sillimanite minerals, sillimanite, cyanite and andalusite, in their pure form, contain one molecule of alumina to one molecule of silica. In pure dumortierite the proportion of alumina is somewhat higher but still not as high as in mullite. Other minerals contain alumina and silica, but in each case, as previously stated, there is a deficiency of alumina in the combined mineral. As a result, additional alumina must be supplied in order to produce the proper ratio of alumina to silica for mullite.

It has been found, when making up a batch for the production of high refractories by adding alumina to materials containing both silica and alumina, or by adding alumina to silica, so as to produce the proper mullite proportions, the strength of the product varies within quite wide ranges even though the final chemical proportions are substantially the same. Andalusite seems to be the best source of combined alumina and silica thus far used. However, the strength of the product varies also with the kind of alumina added to make up the proper proportion of alumina in the product, and this invention relates more particularly to this phase of the subject.

With many ceramic materials, there is a very marked change in volume upon firing. This is very disadvantageous for many reasons.

Andalusite has the property of being transformed into mullite and a glassy matrix without material change in volume. Sintered alumina does not change materially in size when fired. When a mixture of andalusite and alumina is fired to a sufficiently high temperature, the andalusite is transformed into mullite and a glassy matrix, and some, at least, of the alumina unites with the excess silica of the andalusite to form additional mullite. By using sintered alumina in fine grains and in the right proportion, a strong mullite block results without any material change in the volume of the batch during firing. Clay, diaspore or other hydrated alumina may be used to fill the interstices of the batch and form a bond for the green batch without causing objectionable shrinkage during firing.

Andalusite mineral, as customarily found, contains various impurities, which are generally much higher in silica than is andalusite. Pure andalusite has a molecular ratio of alumina to silica of 1 to 1, but even where the impurities are such that the molecular ratio of alumina to silica approaches the 1 to 2 ratio of clay, the mineral still maintains a comparatively constant volume upon heating to high enough temperatures to transform the andalusite into mullite and a glassy matrix.

The most desirable proportion of alumina to andalusite varies with the proportionate amount of alumina to silica in the andalusite mineral used. The proper amount of alumina to give the best results with any particular sample of andalusite can be determined by analyzing the sample and calculating the amount of alumina which must be added to result in a molecular proportion of 3 of alumina to 2 of silica in the combined product.

A mixture containing corundum or sintered alumina produces the best results. The corundum or sintered alumina appears in two forms, the alpha alumina and the beta alumina. Beta alumina was first described by Rankin and Merwin. See Journal of American Chemical Society, 38, pages 568 to 588, and in particular pages 570, 572 and 588. Beta alumina is hexagonal, often appearing in groups of over-lapping triangular plates with perfect basal cleavage. The mean refractive index of alpha alumina is 1.765 and that of beta alumina is about 1.665. The specific gravity of beta alumina is 3.30±0.01, which is less than that of the alpha form. I have found that a product formed from andalusite, for example, and the proper amount of alpha alumina to form mullite is stronger under high temperature tests than a similar product with all beta alumina substituted for the alpha alumina; but I have also found that the substitution of beta alumina for a certain amount of alpha alumina, using a mixture of the two instead of the clear alpha, produces a product materially stronger than that produced by the clear alpha alumina alone. Increasing the amount of beta alumina in proportion to the alpha alumina increases the strength until some point well above 20% of beta alumina is used. Sixty per cent beta alumina and 40% alpha alumina produces a stronger product than 20% beta alumina and 80% alpha alumina. The grain size affects the result somewhat. I prefer graded sizes of the alumina under 80 mesh, but without too much under 300 mesh.

I have not yet determined the exact proportion of beta alumina to alpha alumina which produces the greatest strength, nor the upper limit of beta alumina which will be better than the alpha alumina alone. From what has been previously stated it will appear that 60% of beta alumina to 40% of alpha alumina is much better than all alpha alumina, whereas 100% beta alumina is inferior to all alpha alumina. Apparently the upper limit of beta alumina which will be superior to all alpha alumina is in the neighborhood of 80% beta alumina. Therefore, any amount of beta alumina between 1% and around 80% is an improvement over the uses of clear alpha alumina. Between 30 and 60% of beta alumina is preferred for best results, although 20% beta alumina to 80% alpha alumina has been used in large quantities and has produced a product more satisfactory and stronger under high heat conditions than any which I have been able to secure which were produced from alpha alumina alone added to siliceous material. While for the best results I prefer to add the mixture of beta alumina and alpha alumina to andalusite, it will be understood that a similar aluminous mixture may be added to other siliceous materials with advantage over the use of other forms of alumina with the same siliceous materials.

One specific combination which has exhibited great strength under high heat conditions is an impure andalusite, containing extra silica so that the molecular proportion of silica to alumina in the mineral is about 1.9 to 1, finely ground sintered alumina and diaspore. About 50% andalusite has been used, 24% beta alumina, 16% alpha alumina and 10% diaspore. The diaspore was used as a binder. This is cited merely as one mixture which has given very good results, but not as the best possible mixture, it having been used not because the proportions specified are considered the best possible but because the materials were available. However, it may be stated that the 10% diaspore as a binder has proved the best for that purpose which has been discovered in a long series of experiments.

The product of a properly formed mixture of andalusite and alumina is stronger at high working temperatures, such as from cone 15 to cone 32, than either the straight andalusite product or the straight alumina product. The improved material is strong enough to hold its shape in the bottom of saggers through many repeated firings to above cone 17, and has given satisfactory service as a sagger in a kiln fired as high as cone 32. The improved material may be made to withstand a pressure of 40 lbs. to the square inch at 1500° C. under standard load test conditions with a settle of only two tenths of one percent. This high resistance to crushing and bending stresses at temperatures up to 1600° C. renders it useful for many purposes, and, together with the fact that no gases or vapours are driven off from it until a temperature materially above cone 32 is reached, makes it ideal for high temperature saggers and similar uses.

It will be understood that the materials of the batch are ground and formed into an intimate mixture, shaped as desired, and then fired. The initial firing may be at a comparatively high temperature, or may be only enough to produce sufficient strength in the product to withstand handling until it is subjected to use, and the final firing may be the result of its subjection to heat in its regular use. Under either circumstance, the final firing is sufficient to produce a product which is largely mullite, and articles of a very high strength at high temperatures compared to the strength of other materials at the same temperature.

While some variations have been suggested above, it will be understood that other variations may be made within the scope of the appended claims.

What I claim is:

1. A batch for a ceramic material comprising andalusite and finely divided sintered alumina.

2. A batch for a ceramic material comprising andalusite and finely divided sintered alumina, the proportion of andalusite to alumina being such as to make the proportion of alumina to silica in the batch substantially the same as in mullite.

3. A batch for a ceramic material consisting of andalusite, sintered alumina and hydrated material containing alumina, the proportion of the hydrated material being small enough so that it can be contained within the interstices of the andalusite and sintered alumina particles.

4. A batch for ceramic material consisting of andalusite, finely divided sintered alumina and diaspore, the proportions of the materials being such that the proportion of alumina to silica in the batch is substantially the same as in mullite.

5. A batch for a super-refractory comprising a siliceous material and a mixture of alpha alumina and beta alumina, the two said forms of alumina in the mixture being in proportions between 1 to 4 and 4 to 1.

6. A batch in accordance with claim 5 and in which the percentage of alumina which is beta is between 30 and 60.

7. A batch for a super-refractory comprising mineral andalusite and a mixture of alpha and beta alumina, the two said forms of alumina in the mixture being in proportions between 1 to 4 and 4 to 1.

8. A batch for a super-refractory comprising a mineral of the sillimanite group and alumina in substantially a sufficient amount to make the proportions of alumina to silica in the total mass the same as in mullite, about 10% of the total batch being diaspore and the rest of the added alumina being in the form of sintered alumina, said sintered alumina containing alpha and beta alumina, each between 20% and 80% of the total of said sintered alumina.

9. The method of making a super-refractory which comprises mixing an anhydrous combination of alumina and silica with a mixture of alpha and beta sintered alumina and firing the same, the two said forms of alumina in the mixture being in proportions between 1 to 4 and 4 to 1.

10. The method of making a super-refractory which comprises mixing an anhydrous combination of alumina and silica with a mixture of alpha and beta sintered alumina and diaspore as a binder, and firing the same, the two said forms of alumina in the mixture being in proportions between 1 to 4 and 4 to 1.

11. The method of making a super-refractory which comprises mixing andalusite and a mixture of alpha and beta sintered alumina and firing the same, the two said forms of alumina in the mixture being proportions between 1 to 4 and 4 to 1.

12. The method of making a super-refractory which comprises mixing andalusite, diaspore and a mixture of alpha and beta sintered alumina and firing the same, the two said forms of alumina in the mixture being in proportions between 1 to 4 and 4 to 1.

13. A method of making a super-refractory which comprises mixing with a material containing alumina and silica additional alumina to make the proportions in the entire batch more nearly approximate the proportions of alumina and silica in mullite, the additional alumina comprising not less than 20% of each of the alpha and beta forms of sintered alumina.

14. A super-refractory having high strength at high temperatures and formed from a batch containing a combination of alumina and silica and additional alumina to bring the proportion of alumina to silica in the entire batch more nearly to their proportion in mullite, the additional alumina comprising sintered alumina in both the alpha and beta form, each form constituting at least 25% of said additional alumina.

15. A super-refractory having a composition similar to that of mullite and formed from a batch comprising an anhydrous mineral containing both alumina and silica, and additional alumina, the additional alumina comprising both alpha and beta alumina, each form constituting at least 25% of said additional alumina.

16. A super-refractory having a composition similar to that of mullite and formed from a batch containing andalusite and both alpha and beta alumina, the two said forms of alumina being in proportions between 1 to 4 and 4 to 1.

17. A super-refractory product having a composition similar to that of mullite and formed from a batch containing andalusite, alpha alumina, beta alumina and diaspore, the alpha and beta alumina being in proportions between 1 to 3 and 3 to 1.

18. A super-refractory having a composition similar to that of mullite and formed from a batch containing a combination of alumina and silica and additional alumina, the additional alumina comprising a mixture of sintered alpha and beta alumina in which the beta alumina constitutes between 30 and 60% of the sintered alumina.

FRANK H. RIDDLE.